(12) United States Patent
Beaulieu (10) Patent No.: US 7,142,613 B2
(45) Date of Patent: Nov. 28, 2006

(54) METHODS, SYSTEMS AND DEVICES FOR GENERATING PULSE SHAPES

(75) Inventor: Norman C. Beaulieu, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 778 days.

(21) Appl. No.: 10/107,067

(22) Filed: Mar. 28, 2002

(65) Prior Publication Data
US 2003/0185313 A1  Oct. 2, 2003

(51) Int. Cl.
*H04L 27/04* (2006.01)
*H04L 27/12* (2006.01)
*H04L 27/20* (2006.01)

(52) U.S. Cl. ........................ 375/295; 375/296
(58) Field of Classification Search ................ 375/295, 375/296
See application file for complete search history.

(56) References Cited

U.S. PATENT DOCUMENTS

| 4,737,969 A | | 4/1988 | Steel et al. ................ 375/67 |
| 5,233,628 A | * | 8/1993 | Rappaport et al. .......... 375/224 |
| 5,657,353 A | * | 8/1997 | Hatcher et al. ............. 375/296 |
| 6,885,241 B1 | * | 4/2005 | Huang et al. ............... 330/149 |

OTHER PUBLICATIONS

N.C. Beaulieu, C.C. Tan, M.O. Damen, A "Better Than" Nyquist Pulse, Sep. 2001, IEEE Communications Letters, vol. 5, No. 9.*

* cited by examiner

*Primary Examiner*—Chieh M. Fan
*Assistant Examiner*—Jia Lu (57) ABSTRACT

New systems and methods are provided which use a new pulse shape which performs better in certain circumstances than the raised cosine pulse.

13 Claims, 6 Drawing Sheets

| α | t/T = ±0.05 | t/T = ±0.1 | t/T = ±0.2 | t/T = ±0.25 |
|---|---|---|---|---|
| 0.25 | 5.8117e-08 | 1.2980e-06 | 3.5678e-04 | 2.9462e-03 |
| 0.35 | 3.9253e-08 | 5.4021e-07 | 1.0129e-04 | 9.3536e-04 |
| 0.5 | 2.4134e-08 | 1.8580e-07 | 2.0878e-05 | 2.0154e-04 |
| 0.75 | 1.3836e-08 | 4.5668e-08 | 3.2260e-06 | 4.1433e-05 |
| 1 | 1.3150e-08 | 3.5692e-08 | 1.6144e-06 | 2.2273e-05 |

FIG. 4

| α | t/T = ±0.05 | t/T = ±0.1 | t/T = ±0.2 | t/T = ±0.25 |
|---|---|---|---|---|
| 0.25 | 8.2189e-08 | 2.8184e-06 | 9.7462e-04 | 6.7732e-03 |
| 0.35 | 5.9997e-08 | 1.3896e-06 | 3.9084e-04 | 3.1988e-03 |
| 0.5 | 3.9723e-08 | 5.4890e-07 | 1.0217e-04 | 9.4694e-04 |
| 0.75 | 2.2777e-08 | 1.5761e-07 | 1.5346e-05 | 1.4907e-04 |
| 1 | 1.5281e-08 | 5.8720e-08 | 3.6543e-06 | 3.9247e-05 |

PLUSE SAMPLES, 4 SAMPLES PER SYMBOL PERIOD

| (0,T)   | 1.0000 | 0.887   | 0.5995  | 0.2615  | 0.0000 |
|---------|--------|---------|---------|---------|--------|
| (T,2T)  | 0.0000 | -0.1197 | -0.1143 | -0.0519 | 0.0000 |
| (2T,3T) | 0.0000 | 0.0135  | 0.0014  | -0.0080 | 0.0000 |
| (3T,4T) | 0.0000 | 0.0179  | 0.0278  | 0.0198  | 0.0000 |
| (4T,5T) | 0.0000 | -0.0166 | -0.0196 | -0.0108 | 0.0000 |
| (5T,6T) | 0.0000 | 0.0045  | 0.0023  | -0.0008 | 0.0000 |

FIG. 9

PLUSE SAMPLES, 8 SAMPLES PER SYMBOL PERIOD

| (0,T)   | 1.0000 | 0.9709  | 0.8870  | 0.7583  | 0.5995  | 0.4280  | 0.2615  | 0.1151  | 0.0000 |
|---------|--------|---------|---------|---------|---------|---------|---------|---------|--------|
| (T,2T)  | 0.0000 | -0.0783 | -0.1197 | -0.129  | -0.1143 | -0.0854 | -0.0519 | -0.0218 | 0.0000 |
| (2T,3T) | 0.0000 | 0.0115  | 0.0135  | 0.0088  | 0.0014  | -0.0050 | -0.0080 | -0.0062 | 0.0000 |
| (3T,4T) | 0.0000 | 0.0088  | 0.0179  | 0.0248  | 0.0278  | 0.0260  | 0.0198  | 0.0105  | 0.0000 |
| (4T,5T) | 0.0000 | -0.0096 | -0.0166 | -0.0200 | -0.0196 | -0.0161 | -0.0108 | -0.0050 | 0.0000 |
| (5T,6T) | 0.0000 | 0.0033  | 0.0045  | 0.0040  | 0.0023  | 0.0005  | -0.0008 | -0.0010 | 0.0000 |

FIG. 10

PLUSE SAMPLES, 16 SAMPLES PER SYMBOL PERIOD

| (0,T)   | 1.0000 | 0.9927  | 0.9709  | 0.9353  | 0.8870  | 0.8274  | 0.7583  | 0.6816  | 0.5995  | 0.5142  | 0.4280  | 0.3431  | 0.2615  | 0.1850  | 0.1152  | 0.0532  | 0.0000 |
|---------|--------|---------|---------|---------|---------|---------|---------|---------|---------|---------|---------|---------|---------|---------|---------|---------|--------|
| (T,2T)  | 0.0000 | -0.0439 | -0.0783 | -0.1034 | -0.1197 | -0.1279 | -0.1290 | -0.1240 | -0.1143 | -0.1009 | -0.0854 | -0.0687 | -0.0519 | -0.0361 | -0.0218 | -0.0096 | 0.0000 |
| (2T,3T) | 0.0000 | 0.0070  | 0.0115  | 0.0135  | 0.0135  | 0.0117  | 0.0088  | 0.0052  | 0.0014  | -0.0021 | -0.0050 | -0.0071 | -0.0080 | -0.0077 | -0.0062 | -0.0035 | 0.0000 |
| (3T,4T) | 0.0000 | 0.0042  | 0.0088  | 0.0135  | 0.0179  | 0.0218  | 0.0248  | 0.0269  | 0.0278  | 0.0275  | 0.0260  | 0.0234  | 0.0198  | 0.0154  | 0.0105  | 0.0052  | 0.0000 |
| (4T,5T) | 0.0000 | -0.0050 | -0.0096 | -0.0135 | -0.0166 | -0.0188 | -0.0200 | -0.0202 | -0.0196 | -0.0182 | -0.0162 | -0.0136 | -0.0108 | -0.0079 | -0.0050 | -0.0023 | 0.0000 |
| (5T,6T) | 0.0000 | 0.0019  | 0.0033  | 0.0041  | 0.0045  | 0.0044  | 0.0040  | 0.0032  | 0.0023  | 0.0014  | 0.0005  | -0.0003 | -0.0008 | -0.0010 | -0.0010 | -0.0006 | 0.0000 |

FIG. 11

METHODS, SYSTEMS AND DEVICES FOR GENERATING PULSE SHAPES

FIELD OF THE INVENTION

The invention relates to digital communication systems and digital storage systems, and more specifically to systems, methods and apparatus for generating pulse shapes for use in such systems.

BACKGROUND OF THE INVENTION

It is well understood that in communications systems, the shape of a pulse used to transmit information can have an effect of the performance of the system. A goal of pulse shape design is to provide a shape which does not suffer from intersymbol interference (ISI), while at the same time uses as little excess bandwidth as possible beyond the theoretical minimum required to transmit a given amount of information.

Nyquist's historical paper entitled "Certain Topics in Telegraph Transmission Theory," *AIEE Trans.,* vol 47 pp. 617–644, 1928 introduced a class of ISI-free pulse shapes now commonly referred to as Nyquist pulses. The so-called "raised cosine" pulse is a special case of a Nyquist pulse which has become prevalent in modern systems, for example communications modems, and is the benchmark pulse in modern communications theory. It is noted that for historical reasons, a Gaussian pulse shape is still widely employed in European applications, despite its inferior performance characteristics. The terms "Nyquist pulse" and "raised cosine pulse" have become somewhat synonymous, although more accurately, a "Nyquist pulse" is any ISI-free pulse. The raised cosine pulse with relative excess bandwidth $\alpha$, is specified by its overall frequency spectrum:

$$S(f) = \begin{cases} 1. & 0 \leq f \leq B(1-\alpha) \\ \frac{1}{2}\{1 + \cos(\frac{\pi}{2B\alpha}(f - B(1-\alpha)))\} & B(1-\alpha) \leq f \leq B(1+\alpha) \\ 0. & B(1+\alpha) \leq f \end{cases} \quad (1)$$

$$S(f) = S(-f) \qquad f \leq 0$$

where B is the bandwidth corresponding to symbol repetition rate T=½B, and its corresponding *(scaled)* time function is given by $$p_{RC}(t) = \text{sinc}(t/T)\frac{\cos(2\pi\alpha t/T)}{1 - 4\alpha^2 t^2/T^2} \quad (2)$$

Excess bandwidth is a reference to the allowed bandwidth compared to the theoretical minimum bandwidth required to transmit data at a specified rate (symbol, baud, bit). Practical systems use "excess" bandwidth as real systems are not perfect; timing recovery is hard to do if the excess bandwidth is small. The second generation IS-54 (USA) standard specifies $\alpha=0.35$, the second generation PDC (Japan) standard specifies $\alpha=0.5$. Some satellite modems use $\alpha=1.0$.

The more the excess bandwidth, however, the fewer the number of available channels for a given amount of spectrum. In an ideal world, one would use 0% excess bandwidth. Typically the overall pulse shape is implemented by putting the square root of the spectrum in the transmitter filter with the matched filter in the receiver also having the square root of the pulse spectrum as its frequency response. That is, the pulse is split by taking its square root in frequency and putting half the response in the transmitter and half the response in the receiver. This is known to maximize the signal-to-noise ratio and minimize the average error rate. Thus, the transmitter has a root raised cosine pulse shaping and the receiver matched filter has a root raised cosine shaping.

This pulse shape is characterized by i) certain error rates for different channels, signal-to-noise ratios, and for different symbol timing errors and ii) a certain receiver eye diagram.

Examination of the above equations indicates that the tails of the raised cosine pulse for $\alpha > 0$ decay asymptotically as $t^{-3}$ as is well known. Attempts to develop new pulse shapes to improve upon the raised cosine pulse have focused on pulse shapes with higher rates of decay, for example with asymptotic decays as $t^{-4}$, $t^{-5}$ with the expectation that this higher rate of decay would somehow yield a performance benefit.

SUMMARY OF THE INVENTION

One broad aspect of the invention provides a pulse shaper adapted to produce pulses having a pulse shape substantially specified by a frequency spectrum $\sqrt{S(f)}$ where S(f) is defined by:

$$S(f) = \begin{cases} 1. & 0 \leq f \leq B(1-\alpha) \\ \exp\{\frac{\ln 2}{\alpha B}[B(1-\alpha) - f]\} & B(1-\alpha) \leq f \leq B \\ 1 - \exp\{\frac{\ln 2}{\alpha B}[f - B(1+\alpha)]\} & B \leq f \leq B(1+\alpha) \\ 0. & B(1+\alpha) \leq f \end{cases}$$

$$S(f) = S(-f), \qquad f \leq 0$$

and corresponding (scaled) time function p(t) defined by:

$$p(t) = \text{inverse Fourier transform } \sqrt{\sqrt{S(f)}}$$

where B is a bandwidth corresponding to symbol repetition rate T=½B, $\beta=\ln 2/\alpha B$, and $\alpha$ is a relative excess bandwidth parameter.

In some embodiments, the pulse shaper has a memory adapted to hold a plurality of time domain samples of the pulse shape; and processing logic adapted to multiply each data element of a raw input data stream by the plurality of time domain samples of the pulse shape in sequence.

The plurality of time domain samples preferably comprises at least 2 samples per symbol period for at least six symbol periods, and each of said plurality of time domain samples preferably has at least a 4 bit resolution. Alternatively, there might be 4, 8 or 16 samples per symbol period. Alternatively, the samples might have an 8, 12, 16 or 32 bit resolution.

Another broad aspect provides a modem having one of the above-summarized pulse shapers and a modulator adapted to modulate the output of the pulse shaper.

Another broad aspect provides a system having the above-summarized pulse shaper, means for transmitting a signal pulse shaped by the pulse shaper, and means for receiving a signal pulse shaped by the pulse shaper.

Another broad aspect of the invention provides a method of retrofitting an existing pulse shaping circuit which involves over-writing an existing pulse shape with the new pulse shape.

Another broad aspect of the invention provides a method of transmitting which involves receiving a stream of bits and multiplying each bit by the above pulse shape to produce a pulse shaped signal, modulating the pulse shaped signal to produce a modulated signal; and transmitting the modulated signal.

Another broad aspect provides a computer readable medium having stored thereon a sampled version of the pulse shape.

Yet another broad aspect provides a signal embodied on a transmission medium, the signal containing pulses having the above-summarized pulse shape.

BRIEF DESCRIPTION OF THE DRAWINGS

The invention will now be described in further detail with reference to the attached drawings in which.

DETAILED DESCRIPTION OF THE PREFERRED EMBODIMENTS

Embodiments of the invention provide a new "spline spectrum" pulse. The pulse is one of a family of new pulses that depends on a parameter, n. These pulses have frequency spectra constructed using splines that have a desired number of continuous derivatives, or equivalently, a desired rate of decay in the tails of the pulse in time. Higher n means greater rate of decay in the time response; the pulses decay in time for large values of time as n+1. One expects that a large value of n will give a better pulse than the raised cosine pulse, but no pulses which perform better than the raised cosine pulse were found for values of n larger than one. However, the pulse for n=1 which has time tail rate of decay t(−2) is a better pulse. The reason the n=1 pulse is better is that the first two sidelobes of the pulse in time have smaller amplitudes than the raised-cosine pulses and this leads to a more open eye. The long term decay is less important than the amplitudes of the nearest sidelobes. So, it appears that in past efforts, researchers were looking for greater rates of decay in the pulse tails when they should be looking to minimize the amplitudes of the nearest sidelobes. It is not clear how to adjust the amplitudes of the nearest sidelobes to maximize the opening of the receiver eye or how to adjust the nearest sidelobes to minimize the error rate performance of the pulse.

Figure 1:
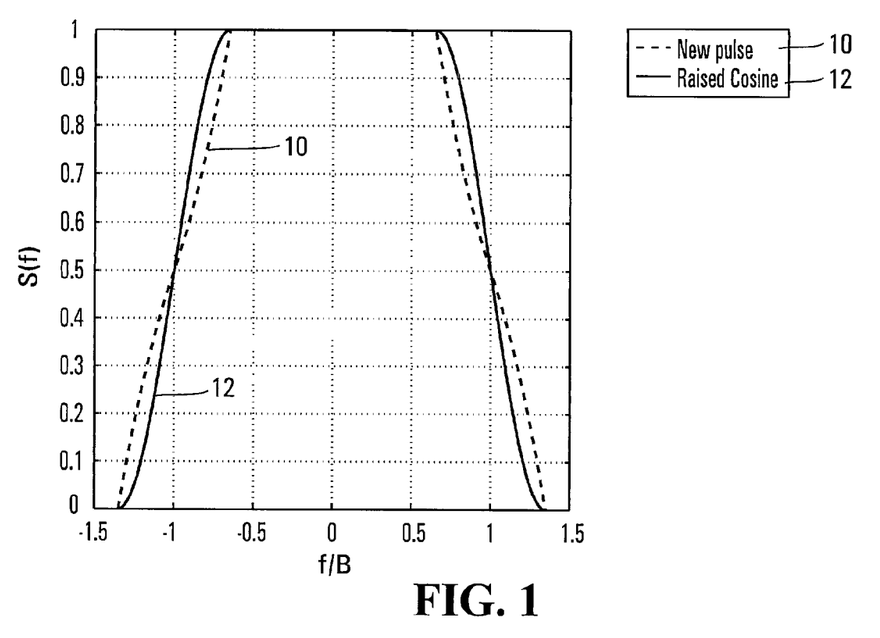
FIG. 1 is a plot of a frequency domain representation of a conventional raised cosine pulse, and a new pulse shape provided by an embodiment of the invention.
Figure 2:
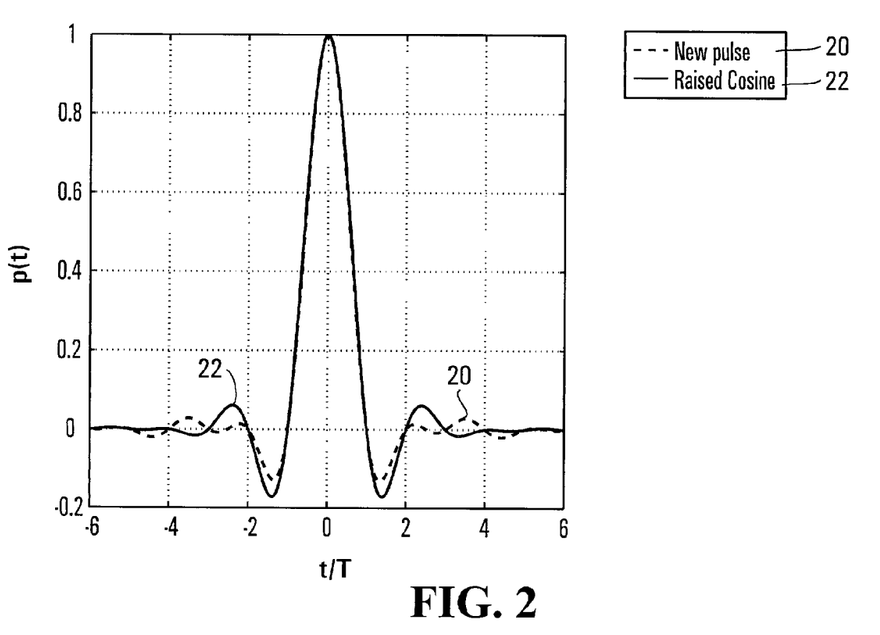
FIG. 2 is a plot of a time domain representation of a conventional raised cosine pulse, and a pulse shape provided by an embodiment of the invention.

The new (n=1) pulse shape provided by an embodiment of the invention is specified by the overall frequency spectrum:

$$S(f) = \begin{cases} 1. & 0 \le f \le B(1-\alpha) \\ \exp\left\{\frac{\ln 2}{\alpha B}[B(1-\alpha)-f]\right\} & B(1-\alpha) \le f \le B \\ 1 - \exp\left\{\frac{\ln 2}{\alpha B}[f-B(1+\alpha)]\right\} & B \le f \le B(1+\alpha) \\ 0. & B(1+\alpha) \le f \end{cases} \quad (3)$$

$$S(f) = S(-f), \quad f \le 0$$

with corresponding (scaled) time function:

$$p(t) = \operatorname{sinc}(2Bt) \cdot \frac{4\beta\pi t \sin(2\pi B\alpha t) + 2\beta^2 \cos(2\pi B\alpha t) - \beta^2}{4\pi^2 t^2 + \beta^2} \quad (4)$$

where $\beta = \ln 2/\alpha B$. It is noted that any pulse which is a scaled replica of this pulse shape is considered to have this pulse shape. FIG. 1 shows the frequency spectrum of the new pulse shape indicated at 10 and FIG. 2 shows the time function indicated at 20, in both cases for $\alpha=0.35$. For the sake of comparison, FIG. 1 also shows the frequency spectrum of a raised cosine pulse with $\alpha=0.35$ indicated at 12, and FIG. 2 shows the time function for that pulse indicated at 22. It can be proved from the above equations that the tail of the new pulse shape decays asymptotically as $t^{-2}$, and thus it actually decays slower than the benchmark raised cosine pulse, and decays much slower than pulse shapes currently being studied with higher rates of decay. It is noted that an infinite sequence of the pulse tails is absolutely summable for both the new pulse and the conventional raised cosine pulse, though the asymptotic rate of decay of the raised cosine pulse is greater.

The pulse shape of FIG. 2 in theory goes on forever in time. In practical systems, the pulse is time limited by truncating to some finite duration. Typically a pulse shape is truncated at one of the zero crossings. For example, the pulse shape might be truncated at +/−six or +/− seven zero crossings.

The overall pulse shape is implemented by putting the square root of the spectrum in the transmitter filter with the matched filter in the receiver also having the square root of the pulse spectrum as its frequency response. That is, the pulse is split by taking its square root in frequency and putting half the response in the transmitter and half the response in the receiver. This is known to maximize the signal-to-noise ratio and minimize the average error rate.

Figure 3A:
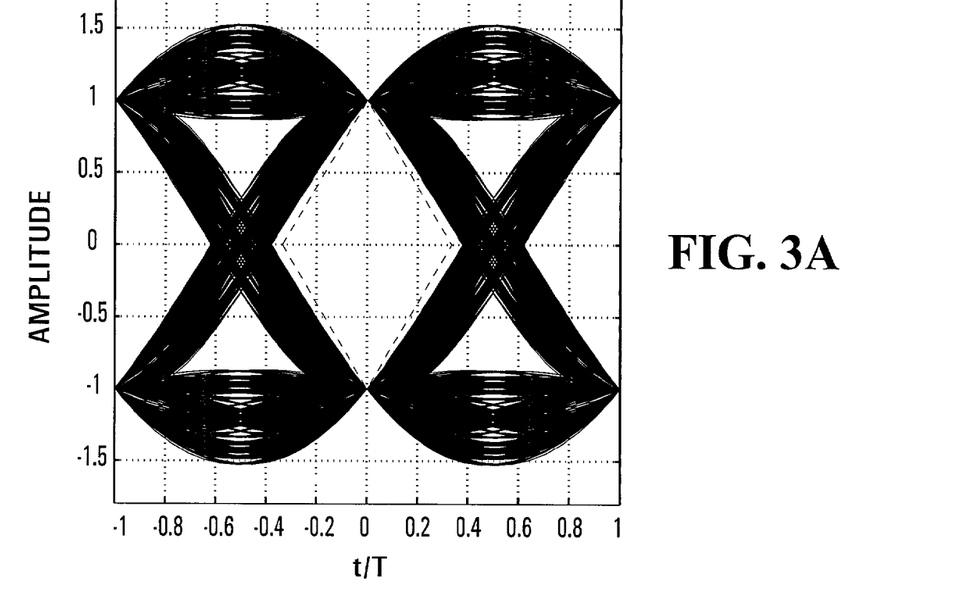
FIG. 3A is a receiver eye diagram for the new pulse shape of FIG. 2.
Figure 3B:
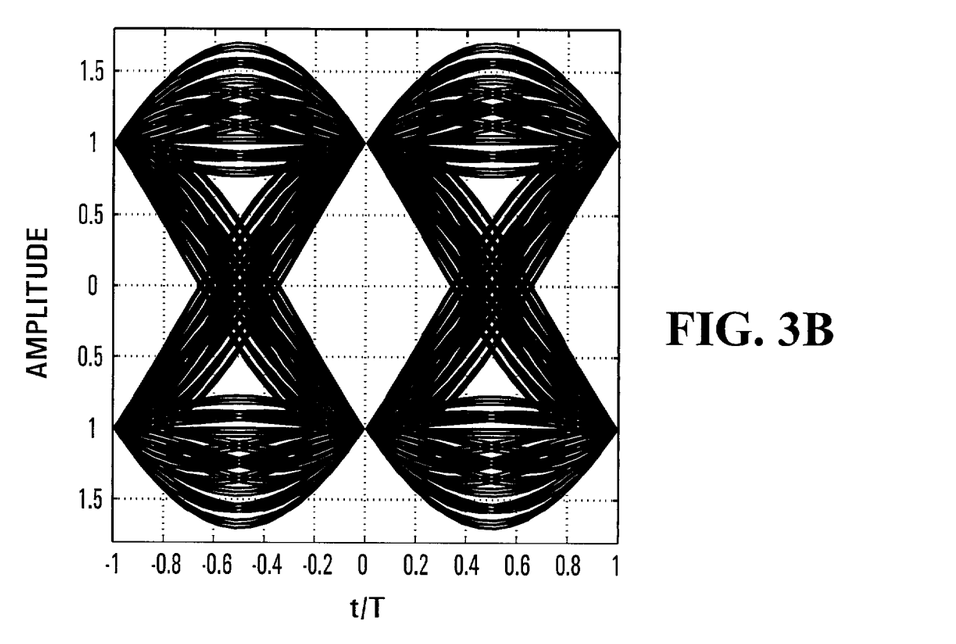
FIG. 3B is a receiver eye diagram for the raised cosine pulse shape of FIG. 2.

The performance of the new pulse shape can be compared to that of the conventional raised cosine pulse with the same parameters. An example of this is provided in FIGS. 3A and 3B which show eye diagrams for the new pulse and the raised cosine pulse respectively, again with $\alpha=0.35$. It can be observed that the eye for the new pulse is more open than for the raised cosine pulse. This can be highlighted by superimposing the inner boundary of the raised cosine pulse from FIG. 3B on the eye of the new pulse in FIG. 3A. Interestingly, this more open eye for the new pulse results despite the fact that it decays at $t^{-2}$ compared to $t^{-3}$ for the raised cosine pulse. This behaviour can be explained by examination of FIG. 2 which shows that the magnitudes of the two largest sidelobes of the raised cosine pulse are larger than the magnitudes of the two largest sidelobes of the new pulse. Also observe that the maximum distortion (the maximum height of the black region measured from the zero axis which occurs at $t/T=0.5$) is less for the new pulse than for the raised cosine pulse, being 1.53 for the former and 1.71 for the latter. The question might be asked, looking at the eye diagram for the raised cosine pulse, why could not one simply draw in a different pulse shape having a better eye. The answer is that the time domain and frequency domain representations are inextricably linked, and such a pulse shape would likely violate the excess bandwidth constraint.

Figure 4:
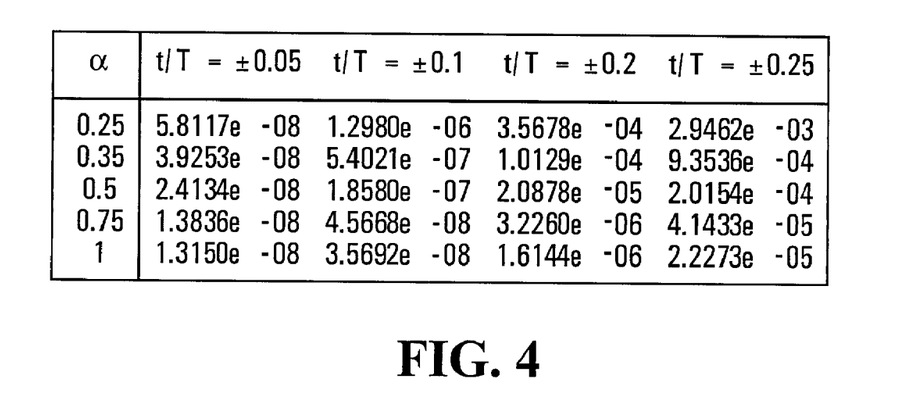
FIG. 4 is a table of error probabilities for the new pulse shape for various timing errors, and for various values of $\alpha$.
Figure 5:
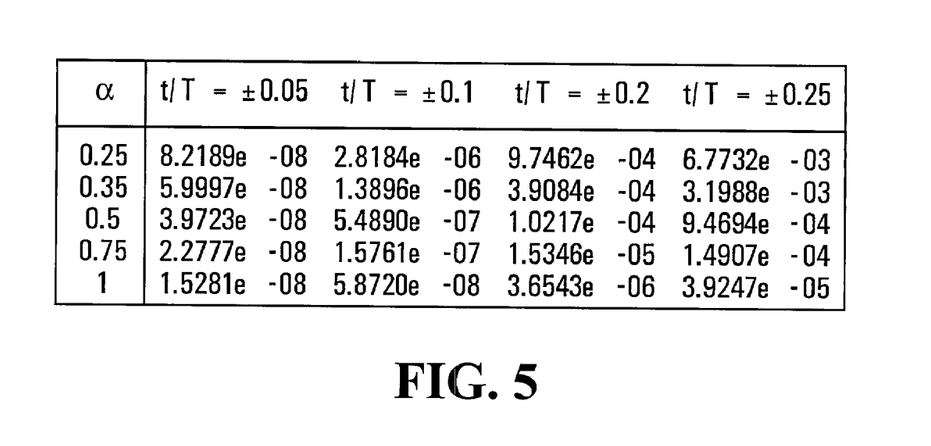
FIG. 5 is a table of error probabilities for the raised cosine pulse shape for various timing errors, and for various values of $\alpha$.

In practical receivers, timing error increases the average symbol error probability as ISI results when the receiver eye is sampled off center. FIGS. 4 and 5 give example average symbol error probabilities of binary antipodal signaling in the presence of symbol timing error for the same two pulses, using the method described in N. C. Beaulieu, "The evaluation of error probabilities for intersymbol and co-channel interference," *IEEE Trans. Commun.*, vol. 31, pp. 1740–1749, December 1991 where an SNR of 15 dB has been assumed. Note that the error rates are smaller for all values of α and timing offset for the new pulse.

It is noted that the above examples show improvement in the error rate performance of the new pulse compared to the raised cosine pulse for a certain set of conditions. There are some conditions, which are not significant practically, under which the new pulse does not out-perform the raised cosine pulse. For example the error rate of the new pulse is greater than that of the raised cosine pulse for all values of timing offset when the excess bandwidth α=1.0 and the SNR=5 dB, for all values of timing offset when the excess bandwidth α=1.0 and α=0.75 and the SNR=0 dB, for α=0.5 and timing offset=0.25 T and SNR=0 dB, and for α=1.0 and timing offset=0.05 T and SNR=10 dB. When the error rate of the new pulse is greater than that of the raised cosine pulse, it is insignificantly so, the difference being irrelevant in a practical system. Further, this occurs at SNR values that are not viable for reliable data transmission. For conventional reliable transmission SNR values of at least 5 dB are required, although this is no longer true in new turbo-coded systems. For SNR values that are needed for reliable transmission, the error rates of the new pulse are between 1.2 (0.8 times) times and 4.9 (0.2 times) times less than the raised cosine pulse. This behavior is consistent with the wider (more open) eye of the new pulse. Thus, the new pulse has smaller maximum distortion, a more open receiver eye, and a smaller symbol timing error rate in the presence of symbol timing error than the raised cosine pulse with the same excess bandwidth for useable to good SNR conditions. In these conditions, the new pulse has as small as roughly one-fifth the error rate and typically one half to one third of the error rate of the raised cosine pulse.

Figure 6:
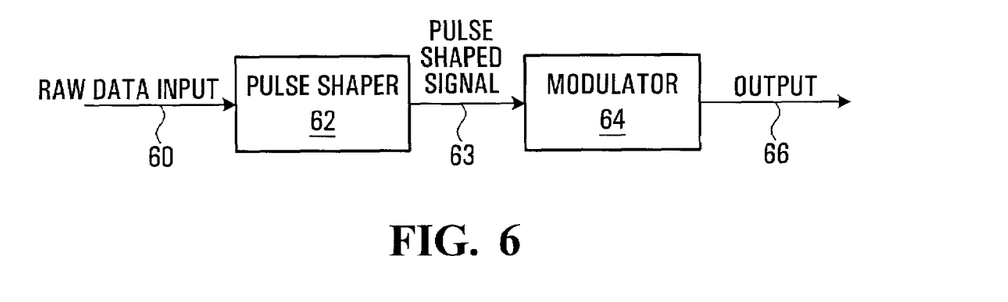
FIG. 6 is a block diagram of a modem provided by an embodiment of the invention.

FIG. 6 shows a block diagram of a modem provided by an embodiment of the invention. The figure shows a raw input datastream 60 which might be a multi-level square wave signal having two or four levels for example. For example, the levels might be −3, −1, 1, 3. The raw input datastream is connected to a pulse shaper 62. The output of the pulse shaper 62 is a pulse shaped signal 63 which is then passed to a modulator 64 where appropriate modulation takes place, for example in frequency or amplitude or phase or amplitude and phase. The output of the modulator 64 is than transmitted as the modem output 66.

The pulse shaper 62 is adapted to multiply the raw input datastream 60 by a pulse shape provided in accordance with the invention as described previously such that the input to the modulator 64 is a pulse shaped signal 63 consisting of a sequence of pulses with each individual pulse having the required pulse shape. It is noted that the order of the pulse shaper 62 and the modulator 64 may be reversed, the pulse shaping then implemented by frequency spectrum filtering. A complete modem implementation would include other components not directly related to this embodiment of the invention.

Figure 7:
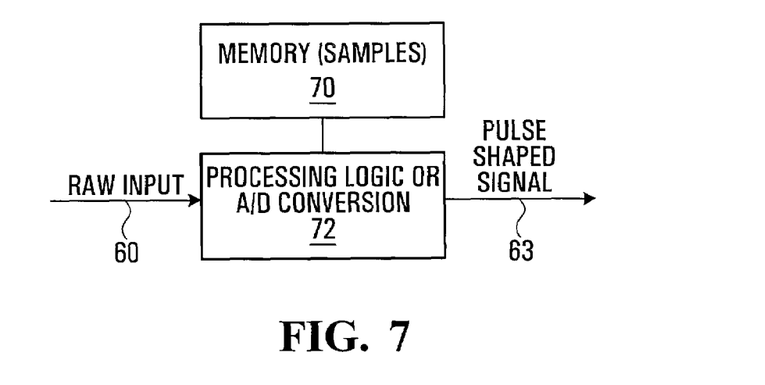
FIG. 7 is a block diagram of a pulse shaper circuit provided by an embodiment of the invention.

FIG. 7 shows an example implementation of a pulse shaper provided by an embodiment of the invention. The pulse shaper has a memory, for example a ROM (read only memory) 70, in which a set of samples of the new pulse shape are stored. To a point, the more samples of the pulse shape that are stored, the more accurate the sampled representation of the new pulse shape will be. The pulse shape will typically be truncated at two of the zero crossings, for example at the sixth zero crossings (i.e. at −6T,+6T) or at the seventh zero crossings (i.e. at −7T,+7T) crossing/symbol periods and preferably on or after at least three zero crossings/symbol periods (i.e. at −3T,+3T). In a preferred implementation, there are 2 or 4 or 8 or 16 or 32 samples per symbol. Each sample might be a 4 bit sample, an 8 bit sample, a 12 bit sample, a 16 bit sample, or a 32 bit sample for example, but other resolutions may alternatively be employed. The higher the resolution of each sample, again, the more accurate the sampled representation of the new pulse shape.

Figure 9:
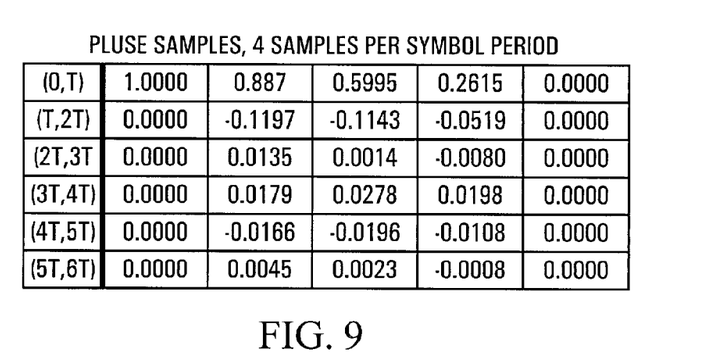
FIGS. 9 to 11 are tables of pulse samples with 4, 8 and 16 samples per symbol period.
Figure 10:
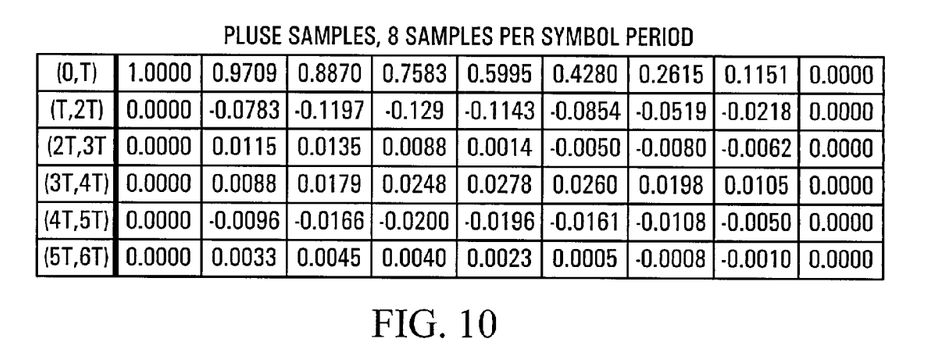
Figure 11:
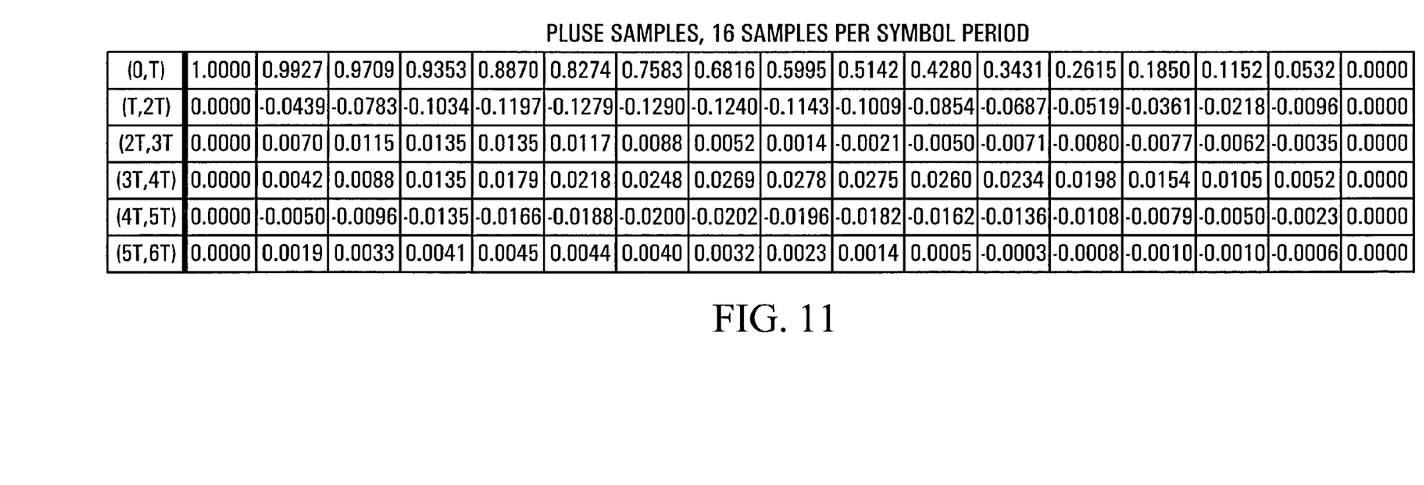

FIGS. 9, 10 and 11 contain example tables of sample values of the pulse which might be used in a ROM implementation. FIGS. 9, 10 and 11 gives four, eight and 16 samples per symbol period respectively, and the pulse is truncated after six symbol periods. These tables give the overall pulse response. This is the usual way that such pulses are specified. The time domain form of the pulse actually transmitted has to be computed by taking the inverse Fourier transform of the square root spectrum numerically. So, the time transmitter pulse is Inverse Fourier Transform $\{\sqrt{S(f)}\}$.

The samples are read out of memory 70 by processing logic 72 and multiplied by the raw input to the pulse shaper to produced the pulse shaped output which is then fed to an analog to digital converter and to the modulator as described above. Equivalently, the pulse shaper may concatenate pulses multiplied by the data stream before modulating the carrier signal. Also, typically, the samples would actually be stored in memory as part of the processing logic 72.

Also, typically the digital to analog converter may follow the modulator and then the pulse shaped output from the pulse shaper is fed directly into a digitally implemented modulator.

There are two primary ways pulse shaping is implemented. The filter approach which is more classical and the look-up table method. The above examples have used the look-up table method. The filter approach, these days, is implemented using a digital Finite Impulse Response Filter (FIR). In the old days it was implemented using an analogue filtering of a rectangular pulse. In the FIR digital filter approach the new pulse shape is approximated. The approximation trades off filter length (and hence delay and processor load) for stop-band attenuation and spectrum roll-off rate. Sometimes a FIR pulse shaping filter is cascaded with a second FIR filter that achieves the desired level of out of band spectral emission levels. This allows relaxing the requirements on the first FIR filter which in total gives an easier processing task.

The pulse shaper may be implemented using any suitable hardware, firmware, software, or combination of these technologies, and is preferably integrated with other parts of the modem or other component in which the pulse shaping is to be performed. For example, the pulse shaper might be implemented on a DSP (digital signal processor), ASIC (application specific integrated circuit), FPGA (field programmable gate array), general purpose processor, or entirely in software (so-called software modems).

Example applications of the pulse shaper include in digital cell phones, cordless telephones, CDMA cell phones, digital personal communications products, multi-carrier modulation systems, OFDM modems, local area networks, point-to-point and point-to-multi-point, equalized and unequalized systems, magnetic information storage and retrieval systems, facsimile, optical transmission and storage systems, satellite communication systems, wireline modems and wireless modems, undersea communication systems, internet applications. More generally, the pulse shaper can be used in any application which would benefit from the improved performance brought about by use of the underlying pulse shape.

It is noted that current systems which perform pulse shaping, for example, according to the raised cosine pulse can realize instant improvement by changing the pulse shape of the existing system to the new pulse shape at the transmitter and by changing the receiver matched filter.

For example any time an error rate of a cellular wireless system is improved, that immediately translates into an increase in system capacity because now the same error rate can be achieved with smaller signal strength, and smaller signal strength translates into less interference for other users, and less interference means a smaller frequency re-use pattern can be employed.

Figure 8:
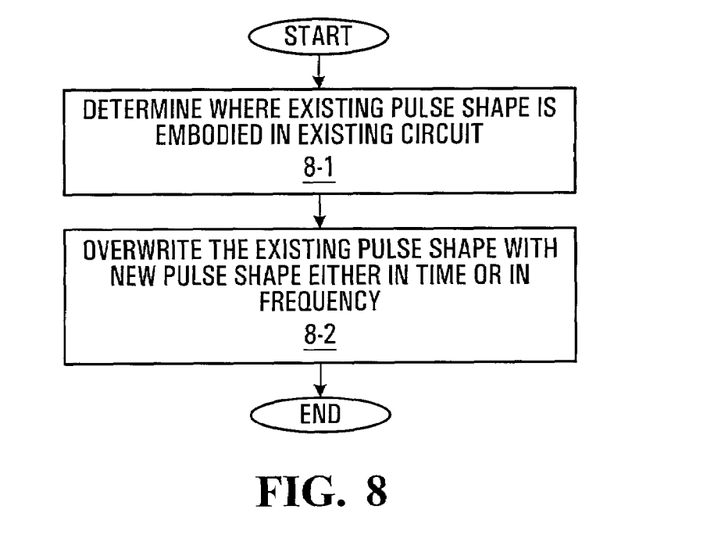
FIG. 8 is a flowchart of a method of retrofitting an existing system to employ the new pulse shape, provided by an embodiment of the invention.

Another embodiment of the invention provides a method of retrofitting an existing pulse producing circuit to produce the improved pulse shape. Referring to FIG. 8, a flowchart begins with the step 8-1 of determining where an existing pulse shape is embodied in an existing circuit. This may be in a memory, or a circuit to name a few examples. Then, at step 8-2, the existing pulse shape is overwritten with a new pulse shape. In some cases, it may be necessary to replace a circuit to achieve this, for example if the existing pulse shape was hard-coded into the pulse producing circuit. By pulse producing circuit, it is meant any circuit which produces such pulses, or any system/device/circuit containing such a circuit.

It is noted that the pulse shape is not to be confused with an abstract intangible entity having no connection with reality and producing no tangible results. The shape of a pulse is a real-world phenomenon describing physical characteristics of a transmission and has considerable effect upon the performance of a system. U.S. Pat. Nos. 4,737,969 and 5,657,353 are directed to new pulse shapes and circuits.

Another embodiment of the invention provides a signal on a transmission medium carrying the above identified pulse shape.

Another embodiment of the invention provides a computer readable medium on which is stored the novel pulse shape.

Numerous modifications and variations of the present invention are possible in light of the above teachings. It is therefore to be understood that within the scope of the appended claims, the invention may be practised otherwise than as specifically described herein.

What is claimed is:

1. A pulse shaper comprising: a memory adapted to hold a plurality of time domain samples of a pulse shape, where the pulse shape is substantially specified by a frequency spectrum $\sqrt{S(f)}$ where f represents frequency and S(f) is defined by:

$$S(f) = \begin{cases} 1, & 0 \le f \le B(1-\alpha) \\ \exp\left\{\frac{\ln 2}{\alpha B}[B(1-\alpha)-f]\right\} & B(1-\alpha) \le f \le B \\ 1 - \exp\left\{\frac{\ln 2}{\alpha B}[f - B(1+\alpha)]\right\} & B \le f \le B(1+\alpha) \\ 0, & B(1+\alpha) \le f \end{cases}$$

$$S(f) = S(-f), \quad f \le 0$$

and corresponding (scaled) time function p(t) defined by:

p(t)=inverse Fourier transform $\sqrt{S(f)}$ where B is a bandwidth corresponding to symbol repetition rate T=½B, and α is a relative excess bandwidth parameter; processing logic adapted to multiply each data element of a raw input data stream by the plurality of time domain samples of the pulse shape in sequence.

2. A pulse shaper according to claim 1 wherein said plurality of time domain samples comprises at least 2 samples per symbol period for at least three symbol periods.

3. A pulse shaper according to claim 1 wherein each of said plurality of time domain samples has at least a 4 bit resolution.

4. A pulse shaper according to claim 1 wherein each of said plurality of time domain samples has at least an 8 bit resolution.

5. A pulse shaper according to claim 1 wherein each of said plurality of time domain samples has at least a 16 bit resolution.

6. A pulse shaper according to claim 1 wherein said plurality of time domain samples comprises at least 2 samples per symbol period for at least six symbol periods.

7. A pulse shaper according to claim 1 wherein said plurality of time domain samples comprises at least 4 samples per symbol period for at least six symbol periods.

8. A pulse shaper according to claim 1 wherein said plurality of time domain samples comprises at least 8 samples per symbol period for at least six symbol periods.

9. A pulse shaper according to claim 1 wherein said plurality of time domain samples comprises at least 16 samples per symbol period for at least six symbol periods.

10. A modem comprising:
a pulse shaper according to claim 1;
a modulator adapted to modulate die output of the pulse shaper.

11. A system comprising:
a pulse shaper according to claim 1;
means for transmitting a signal pulse shaped by the pulse shaper;
means for receiving a signal pulse shaped by the pulse shaper.

12. A method of retrofitting an existing pulse shaping circuit comprising;
over-writing an existing pulse shape with a new pulse shape substantially defined according to a frequency spectrum $\sqrt{S(f)}$ where f represents frequency and $$S(f) = \begin{cases} 1, & 0 \le f \le B(1-\alpha) \\ \exp\left\{\frac{\ln 2}{\alpha B}[B(1-\alpha)-f]\right\} & B(1-\alpha) \le f \le B \\ 1 - \exp\left\{\frac{\ln 2}{\alpha B}[f-B(1+\alpha)]\right\} & B \le f \le B(1+\alpha) \\ 0, & B(1+\alpha) \le f \end{cases}$$

$$S(f) = S(-f), \quad f \le 0$$

and corresponding (scaled) time function p(t) defined by:

$$p(t) = \text{inverse fast Fourier transform } \sqrt{S(f)}$$

where B is a bandwidth corresponding to symbol repetition rate T=½B, and α is a relative excess bandwidth parameter.

13. A method of transmitting comprising:
receiving a stream of bits;
multiplying each bit by a pulse shape, the pulse shape being substantially defined according to a frequency spectrum √S(f) where f represents frequency and $$S(f) = \begin{cases} 1, & 0 \le f \le B(1-\alpha) \\ \exp\left\{\frac{\ln 2}{\alpha B}[B(1-\alpha)-f]\right\} & B(1-\alpha) \le f \le B \\ 1 - \exp\left\{\frac{\ln 2}{\alpha B}[f-B(1+\alpha)]\right\} & B \le f \le B(1+\alpha) \\ 0, & B(1+\alpha) \le f \end{cases}$$

$$S(f) = S(-f), \quad f \le 0$$

where B is a bandwidth corresponding to symbol repetition rate T=½B, and α is a relative excess bandwidth parameter to produce a pulse shaped signal;

modulating the pulse shaped signal to produce a modulated signal; and transmitting the modulated signal.

\* \* \* \* \*

UNITED STATES PATENT AND TRADEMARK OFFICE
CERTIFICATE OF CORRECTION

PATENT NO. : 7,142,613 B2
APPLICATION NO. : 10/107067
DATED : November 28, 2006
INVENTOR(S) : Norman C. Beaulieu It is certified that error appears in the above-identified patent and that said Letters Patent is hereby corrected as shown below:

Column 8, line 22 (claim 1), change "$\sqrt{\sqrt{s(f)}}$" to read -- $\sqrt{s(f)}$ --

Column 8, line 54 (claim 10), change "die" to read -- the --

Column 8, line 13 (claim 12), change "$\sqrt{\sqrt{s(f)}}$" to read -- $\sqrt{s(f)}$ --

Signed and Sealed this

Twenty-fifth Day of December, 2007

JON W. DUDAS
*Director of the United States Patent and Trademark Office*